US006605131B2

(12) United States Patent
Vanderveen et al.

(10) Patent No.: US 6,605,131 B2
(45) Date of Patent: Aug. 12, 2003

(54) INTEGRATED ACTIVE NOISE CONTROL WITH SELF-CLEANING FILTER APPARATUS

(75) Inventors: James K. Vanderveen, Blenheim (CA); Ian R. McLean, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 09/855,285

(22) Filed: May 15, 2001

(65) Prior Publication Data

US 2001/0049999 A1 Dec. 13, 2001

Related U.S. Application Data

(60) Provisional application No. 60/211,067, filed on Jun. 13, 2000.

(51) Int. Cl.[7] .................... B01D 35/143; B01D 29/66; B01D 29/72

(52) U.S. Cl. .................... 95/11; 95/20; 95/29; 95/280; 95/282; 55/283; 55/293; 55/291; 55/302; 55/385.3; 55/432; 96/380; 96/421; 381/71.5

(58) Field of Search .................... 55/283, 292, 293, 55/302, 291, 309, 385.3, 432; 95/11, 20, 29, 278, 280, 282, 273; 96/380, 397, 389, 417, 421, 422; 381/71.5, 71.7

(56) References Cited

U.S. PATENT DOCUMENTS

| | | | | |
|---|---|---|---|---|
| 4,388,091 A | | 6/1983 | Khosropour | |
| 4,482,366 A | * | 11/1984 | Camplin et al. | 137/835 |
| 5,176,114 A | * | 1/1993 | Brackett | 123/184.42 |
| 5,446,790 A | | 8/1995 | Tanaka | |
| 5,606,311 A | * | 2/1997 | Polidan et al. | 340/607 |
| 5,828,759 A | | 10/1998 | Everingham | |
| 6,084,971 A | | 7/2000 | McLean | |
| 6,213,311 B1 | * | 4/2001 | Coric | 210/384 |

FOREIGN PATENT DOCUMENTS

| | | |
|---|---|---|
| CH | 655 362 A5 | 4/1986 |
| EP | 0884471 A2 | 12/1998 |
| WO | WO 95/07748 A1 | 3/1995 |
| WO | WO 00/04532 | 1/2000 |

OTHER PUBLICATIONS

Article—Averdieck, "Particulate Monitoring With Electrodynamic Technology", Pollution Equipment News, Aug. 1997.

Article—Bugli, "Filter Performance Requirements for Engine Air Induction Systems", SAE Paper 970556, 1997.

Copy of Patent Application for "Dust Sensing Assembly Air Intake System"; Application No. 09/814,228.

Intenrational Search Report dated Oct. 11, 2001.

* cited by examiner

*Primary Examiner*—Robert A. Hopkins

(57) ABSTRACT

An air induction system with active noise control includes a self-cleaning air filter that is integrated within an air intake housing. The self-cleaning air filter filters out contaminants such as dust and dirt particulates from air flowing through the intake housing. The self-cleaning filter is powered and controlled by the same electronic unit that is used to power the active noise control system.

19 Claims, 1 Drawing Sheet

INTEGRATED ACTIVE NOISE CONTROL WITH SELF-CLEANING FILTER APPARATUS

RELATED APPLICATION

This application claims priority to provisional application 60/211,067 filed on Jun. 13, 2000.

BACKGROUND OF THE INVENTION

1. Field of the Invention

This invention relates to an integrated self-cleaning air filter assembly for a vehicle air intake system having active noise control.

2. Related Art

Internal combustion engines include air induction systems for conducting air to the engine. Engine noise is propagated through the air induction systems, which is undesirable. Noise attenuation mechanisms have been installed within the air induction systems to reduce these noises. Typically these noise attenuation mechanisms include a speaker, a sound detector, a signal generator, and various other components that are used to reduce noise generated within the air induction system. These components are mounted inside an air duct housing.

The air that is drawn into the air induction system includes dust, dirt, and other particulate contaminants. These contaminants can clog the engine resulting in poor performance. An air filter is typically installed within the air induction system to remove these contaminants from the airflow prior to the air being drawn into the engine. When operating under heavy dust conditions, the air filter can quickly become clogged, requiring replacement. This results in poor engine performance and significant vehicle downtime to replace the filters, which is undesirable. Additionally, each replacement filter has poor initial filter efficiency because the holes in the new filter must be partially plugged with a first dust exposure to achieve the optimal filter efficiency.

It is the object of the present invention to provide a simple and effective apparatus and method for cleaning the air filter to overcome the deficiencies outlined above.

SUMMARY OF THE INVENTION

An air induction system with active noise control draws in air to operate a vehicle's internal combustion engine. The air that is drawn into the system includes contaminants such as dust and dirt particulates that can clog the engine. The subject air induction system includes a self-cleaning air filter that is integrated within an air intake housing. The self-cleaning filter is preferably powered and controlled by the same electronic unit that is used to power the active noise control system.

In a preferred embodiment, the system includes an air intake housing having an inlet and an outlet and defining an airflow passageway between the inlet and the outlet. An active noise control assembly for reducing noise levels and the air filter are mounted within the housing. The filter includes a self-cleaning mechanism selectively actuated to remove particulates trapped within the filter under predetermined conditions. The system also includes a dust-dumping valve that is mounted underneath the filter to remove particulates from the air intake housing upon activation of the self-cleaning mechanism.

In one embodiment, the self-cleaning mechanism includes piezo-electric material that is in direct contact with the filter. The piezo-electric material provides a vibrational input force to the filter upon receipt of an electronic control signal to break free particulates from the filter.

In another embodiment, the self-cleaning mechanism includes a pressure pulse device to provide intermittent pressure pulses to remove particulates from the filter. The pressure pulse device includes an air compressor, a plurality of venturi air pulse directors spaced about the air filter, and a plurality of solenoids for providing pulsing input forces for air flowing through the venturi air pulse directors to blow the particulates free from the filter.

Preferably, the self-cleaning mechanism is comprised of both a vibration and pressure pulse device. The air filter is simultaneously vibrated and subjected to air pressure pulses to loosen and remove particulates from the filter.

The method of cleaning the air filter in an air induction housing with an active noise control system includes the following steps. A filter check diagnostic cycle is initiated to determine a filter dirt level, the filter dirt level is compared to a predetermined limit, and a self-cleaning mechanism is automatically actuated when the filter dirt level exceeds the predetermined limit to remove particulates from the filter. Additional steps include vibrating the air filter and/or directing air pulses at the air filter to remove particulates, and removing the particulates from the air intake housing.

The subject apparatus provides a simple method for automatically cleaning the air filter in an air induction system with active noise control. This results in reduced engine wear and can significantly extend filter life and possibly even eliminate the need for replacement filters.

These and other features of the present invention can be best understood from the following specification and drawings, the following of which is a brief description.

DETAILED DESCRIPTION OF AN EXEMPLARY EMBODIMENT

Figure 1:
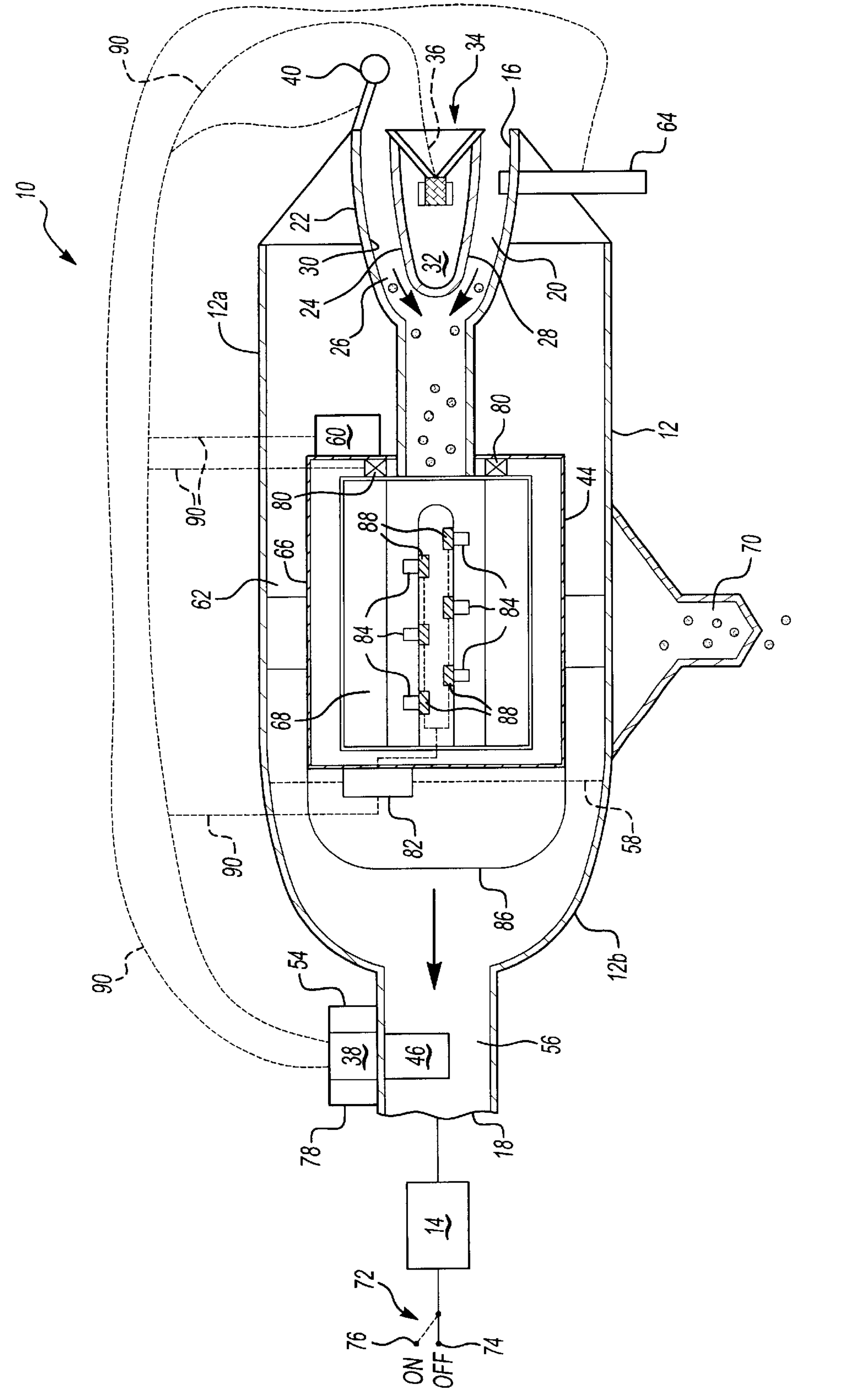
FIG. 1 is a schematic diagram of an air induction system with an active noise control incorporating the subject invention.

Referring to the drawings, FIG. 1 shows an air intake or induction system 10 including an air intake housing 12 forming part of noise attenuation assembly. The air induction system 10 provides air to an internal combustion engine 14. The air intake housing 12 has an inlet 16 and an outlet 18 and an airflow passageway 20 that extends between the inlet and the outlet.

Mounted within the air intake housing 12 is the active noise control assembly including a speaker housing 22 and a mid-body portion 24 is mounted within the speaker housing 22. The mid-body portion 24 is concentrically positioned within speaker housing 22 on a pair of integrally formed struts (not shown) to define an annular passage 26 between an exterior surface 28 of the mid-body portion 20 and an interior surface 30 of the speaker housing 12. The mid-body portion 20 is preferably parabola shaped to define a central chamber 32 with a tapered bottom end facing the engine 14 and an open end facing away from the engine 14.

A speaker assembly 34 is mounted within the chamber 32 and includes a speaker connector 36 that is operably connected to an electronics center 38. The electronics center 38 can include a controller, microprocessor unit, or other similar device whose operation is well known in the art.

A sound detector 40, such as a microphone for example, is mounted adjacent to the speaker housing 22 to sense noise emanating though the air intake housing 12. The sound detector 40 generates a noise signal that is sent to the electronics center 38 where the signal is phase-shifted by approximately 180 degrees. The phase-shifted signal is then sent to the speaker 34 to generate a sound field that cancels out or attenuates the noise detected by the sound detector 40.

The electronics center 38 is mounted to an exterior surface of the speaker housing 22 or air intake housing 12. The sound detector 40 is preferably mounted adjacent to the annular passage 26 in a forward position extending beyond the open end of the speaker housing 22.

An air filter 44 is mounted within the air intake housing 12 downstream from the noise attenuation system. The air filter 44 filters out dust, dirt, and other particulate contaminants that are drawn into the air intake housing 12. A particulate sensor assembly 46 is mounted between the air filter 44 and the engine 14. The particulate sensor assembly 46 generates a particulate signal that represents the particulate concentration level prior to air entering the engine 14. The signal is sent to an engine management system, which includes a system controller or microprocessor. The signal can then be sent to an output device such as a graphical display that can give a visual or an audible warning if particulate concentration levels are higher than a predetermined minimum. Preferably, all of the electronics for the active noise control, filter, and all of the sensors are integrated into the electronics center 38.

Preferably, the particulate sensor assembly 46 is mounted on an intake manifold positioned next to the engine 14. Optionally, the particulate sensor assembly 46 can be integrated into a mass air flow sensor assembly 54 mounted between the air filter 44 and the engine 14. An intake manifold mount is preferred to better protect the engine 14. If the clean air hose is disconnected, the particulate sensor assembly 46 in this configuration will be able to detect the hose disconnect.

The mass air flow sensor assembly 54 includes a flow sensor that monitors the amount (mass per second) of air flowing through the air intake housing 12. The particulate sensor 46 includes a probe that extends through a wall of the housing 12 into an airflow passage 56 located downstream from the air filter 44.

Preferably, the air intake housing 12 is a two (2) piece housing whose pieces can be selectively separated for service purposes. The housing 12 has a first section 12*a* that houses the speaker housing 22 and the air filter 44 and a second section 12*b* that supports the mass air flow sensor assembly 54 and integrated particulate sensor 46. The housing sections 12*a*, 12*b* are connected at a service joint 58. The housings 12*a*, 12*b* can be connected by fasteners or other similar means that provide easy assembly and disassembly.

An optional by-pass device 60 can also be incorporated into the system. The by-pass mechanism 60 is activated if the particulate signal indicates that the air is clean, i.e., the particulate concentration is below a predetermined amount. When the by-pass mechanism 60 is activated, the air does not require filtering and thus is directed around the filter 44. This avoids the air pressure drop associated with air flowing through the filter 44 and lengthens filter life.

The air intake housing 12 with the by-pass mechanism 60 is modified to include the first airflow passageway 20 from the inlet 16 through the filter 44 and out the outlet 18 and a second airflow passageway 62 from the inlet 16 around the filter 44 to the outlet 18. When particulate concentration levels are below a predetermined minimum level, a control signal is sent to the by-pass mechanism 60 to direct air from the first passageway 20 to the second passageway 62. In the by-pass embodiment, an upstream particulate sensor 64 is mounted adjacent to the inlet 16 of the air intake housing 12. The upstream particulate sensor 64 generates a particulate signal that is compared to a predetermined value to determine whether or not the by-pass mechanism 60 should be activated. If the particulate levels are below a predetermined value then the by-pass mechanism 60 is activated. The by-pass mechanism is more fully described in co-pending application Ser. No. 09/814,228 filed on Mar. 21, 2001 entitled "Dust Sensing Assembly Air Intake System" herein incorporated by reference.

The air filter 44 includes a self-cleaning mechanism that is automatically activated under pre-specified conditions to remove dirt and other contaminants from the filter 44. The air filter 44 is centrally mounted within the housing downstream from the active noise control assembly. The air filter includes a filter housing 66 and a filter 68 having a plurality of holes (not shown) of a predetermined size to allow sufficient airflow through the filter while still being capable of filtering out contaminants. Preferably, the self-cleaning mechanism for the air filter 44 and the active noise control are both powered and controller by the electronics center 38.

A dust dumping valve 70 or other similar device is mounted underneath the filter 44 to remove the contaminants during and/or after the self-cleaning mechanism has completed a cleaning cycle. In the preferred embodiment, the cleaning cycle is controlled by a vehicle ignition key control 72. The key-activated controller 72 is movable between key-off 74 and key-on 76 positions. Preferably, a filter-check diagnostic cycle 78 is initiated when the key-activated controller 72 is moved to the key-off 74 position. The self-cleaning mechanism is activated when the diagnostic cycle indicates a dirt level above a predetermined limit.

In one embodiment, the self-cleaning mechanism includes piezo-electric material 80 placed on the filter housing 66, and which is in direct contact with the filter 68. The piezo-electric material provides a rapping or vibrational input force to the filter 68 upon receipt of an electronic control signal from the electronics center 38. As the filter 68 vibrates, the particulates are loosened from the filter.

In another embodiment, the self-cleaning mechanism includes a pressure pulse device that provides intermittent pressure pulses to remove particulates from the filter 68. The pressure pulse device includes an air compressor 82 mounted to the air filter housing 66, a plurality of venturi air pulse directors 84 spaced about the air filter 68, a surge tank 86, and a plurality of solenoids 88. The electronic center 38 provides an input signal to select and switch the solenoids 88 intermittently to maximize pressure pulses. The air pulses are directed against the outer surface of the filter 68 to blow the particulates free from the special surface loading media filter.

In the preferred embodiment, the self-cleaning mechanism includes both the piezo-electric material 80 and the pressure pulse device. When the cleaning cycle is initiated, the vibration from the piezo-electric material 80 loosens and breaks free the particulates and the air pressure pulses blow the particulates away from the filter 68. The particulates are then eliminated from the system 10 via the dust dump valve 70.

Flexible cable wire connections 90 are used to connect the air compressor 82, solenoids 88, piezo-electric material 80, by-pass mechanism 60, speaker assembly 34, microphone 40, and sensors 46, 64 to the electronics center 38. The electronics center 38 can be mounted on the intake housing 12 or remotely from the housing and can include a central processing unit (CPU) or other similar microprocessor.

The method of cleaning the air filter 44 includes the following steps. A filter check diagnostic cycle is initiated to determine a filter dirt level, the filter dirt level is compared to a predetermined limit, and the self-cleaning mechanism is automatically actuated when the filter dirt level exceeds the predetermined limit to remove particulates from the filter. The air filter is vibrated to remove the particulates or air pulses are directed at the filter to remove the particulates. Preferably, the air filter is simultaneously vibrated as and air pulses are directed at the air filter to remove particulates. Additional steps include initiating the filter check diagnostic cycle when the ignition key is turned off and removing the particulates after the self-cleaning mechanism has been activated.

The subject invention provides a method an apparatus for to automatically clean the air filter in an air induction system with active noise control. The advantages of a self-cleaning filter not only extend the filter life to the point where replacement may no longer be necessary but also improves the overall efficiency of the filter over the life of the vehicle. Efficiency is improved because the holes in the filter that are plugged with the first dust exposure are never removed from the initial filter, thus eliminating the initial poor efficiency performance that exists for replacement filters.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. An air induction system for a vehicle engine comprising:

an air intake housing having an inlet and an outlet and defining an airflow passageway between said inlet and said outlet;

an active noise control assembly for reducing noise levels mounted within said housing adjacent to said inlet; and an air filter mounted within said housing to filter particulates from air flowing through said airflow passageway wherein said filter includes a self-cleaning mechanism selectively actuated to remove particulates trapped within said filter under predetermined conditions.

2. A system according to claim 1 including an electronic controller for simultaneously controlling said active noise control assembly and said self-cleaning mechanism.

3. A system according to claim 1 wherein said air filter is centrally mounted within said housing downstream from said active noise control assembly.

4. A system according to claim 1 wherein said self-cleaning mechanism includes a dust dumping valve mounted underneath said filter for removing particulates from said filter and said air intake housing upon activation of said self-cleaning mechanism.

5. A system according to claim 1 wherein said filter includes a filter housing substantially enclosing said filter and said self-cleaning mechanism includes piezo-electric material positioned inside said filter housing and in direct contact with said filter wherein said piezo-electric material provides a vibrational input force to said filter upon receipt of an electronic control signal to break free particulates from said filter.

6. A system according to claim 1 wherein said self-cleaning mechanism includes a pressure pulse device having at least one outlet positioned adjacent to said filter to provide intermittent pressure pulses to remove particulates from said filter.

7. A system according to claim 6 wherein said air filter includes an air filter housing for mounting said air filter within said air intake housing and wherein said pressure pulse device includes an air compressor mounted to said air filter housing, a plurality of venturi air pulse directors comprising said outlet and being spaced about said air filter, and a plurality of solenoids for providing pulsing input forces for air flowing through said venturi air pulse directors to blow the particulates free from said filter.

8. A system according to claim 1 including a key-activated controller movable between key-off and key-on positions wherein a filter check diagnostic cycle is initiated when said key-activated controller is moved to said key-off position and said self-cleaning mechanism is activated when said diagnostic cycle indicates a dirt level above a predetermined limit.

9. A system according to claim 1 wherein said active noise control assembly includes a speaker housing and a mid-body portion with a speaker assembly, said mid-body portion being mounted within said speaker housing such that a portion of said airflow passageway is formed between said speaker housing and said mid-body portion.

10. An air induction system for a vehicle engine comprising:

an air intake housing having an inlet and an outlet and defining an airflow passageway between said inlet and said outlet;

an active noise control assembly for reducing noise levels mounted within said housing adjacent to said inlet;

an air filter mounted within said housing to filter particulates from air flowing through said airflow passageway wherein said filter includes a self-cleaning mechanism selectively actuated to remove particulates trapped within said filter under predetermined conditions;

a dust dumping valve mounted underneath said filter for removing particulates from said air intake housing upon activation of said self-cleaning mechanism; and an electronic controller for simultaneously controlling said active noise control assembly and said self-cleaning mechanism.

11. A system according to claim 10 wherein said self-cleaning mechanism includes a vibrational input device that vibrates said filter to break the particulates free.

12. A system according to claim 10 wherein said self-cleaning mechanism includes an air pulse device that generates intermittent air pulses at said filter to remove particulates.

13. A system according to claim 10 wherein said self-cleaning mechanism includes a vibrational input device that vibrates said filter to break the particulates free and an air pulse device that generates intermittent air pulses at said filter simultaneously with vibration of said filter to remove particulates.

14. A method of cleaning an air filter in an air induction housing with an active noise control system for a vehicle engine comprising the steps of:

(a) initiating a filter check diagnostic cycle to determine a filter dirt level;

(b) comparing the filter dirt level to a predetermined limit;

(c) automatically actuating a self-cleaning mechanism when the filter dirt level exceeds the predetermined limit to remove particulates from the filter; and (d) removing the particulates from the air induction housing after the self-cleaning mechanism has been activated.

15. A method according to claim 14 wherein step (c) further includes directing air pulses at the filter to remove the particulates.

16. A method of cleaning an air filter in an air induction housing with an active noise control system for a vehicle engine comprising the steps of:

(a) initiating a filter check diagnostic cycle to determine a filter dirt level when a key control is moved to a key-off position (b) comparing the filter dirt level to a predetermined limit; and (c) automatically actuating a self-cleaning mechanism when the filter dirt level exceeds the predetermined limit to remove particulates from the filter.

17. A method of cleaning an air filter in an air induction housing with an active noise control system for a vehicle engine comprising the steps of:

(a) initiating a filter check diagnostic cycle to determine a filter dirt level;

(b) comparing the filter dirt level to a predetermined limit;

(c) automatically actuating a self-cleaning mechanism when the filter dirt level exceeds the predetermined limit to remove particulates from the filter and vibrating the air filter to remove the particulates.

18. A method of cleaning an air filter in an air induction housing with an active noise control system for a vehicle engine comprising the steps of:

(a) initiating a filter check diagnostic cycle to determine a filter dirt level;

(b) comparing the filter dirt level to a predetermined limit;

(c) automatically actuating a self-cleaning mechanism when the filter dirt level exceeds the predetermined limit to remove particulates from the filter and simultaneously vibrating the air filter and directing air pulses at the air filter to remove particulates.

19. A method of cleaning an air filter in an air induction housing with an active noise control system for a vehicle engine comprising the steps of:

(a) providing an air intake housing; mounting an active noise control system within the air intake housing to reduce noise levels; mounting an air filter within the air intake housing downstream of the active noise control system, and measuring particulate concentration level within the air intake housing prior to step (b);

(b) initiating a filter check diagnostic cycle to determine a filter dirt level;

(c) comparing the filter dirt level to a predetermined limit;

(d) automatically actuating a self-cleaning mechanism when the filter dirt level exceeds the predetermined limit to remove particulates from the filter.

* * * * *